United States Patent Office

2,958,578
Patented Nov. 1, 1960

2,958,578

MANUFACTURE OF FINELY DIVIDED METAL SILICATE PRODUCTS

Chester L. Baker, Narberth, and John Frankle Austin, Philadelphia, Pa. (both % Philadelphia Quartz Co., Public Ledger Bldg., Philadelphia, Pa.)

No Drawing. Filed Mar. 12, 1958, Ser. No. 720,816

10 Claims. (Cl. 23—110)

This invention relates to manufacture of finely divided metal silicate products; and it comprises a process of producing a finely divided product containing a metal silicate and frequently also containing metal oxide and/or silica in finely divided form, said process comprising mixing an aqueous solution of sodium silicate, having a weight percent ratio of $Na_2O$ to $SiO_2$ within the range of from about 2:1 to 1:4 and a concentration of $SiO_2$ ranging from about 1 to 30 percent by weight, with ammonia as a coacervating agent in a quantity and under conditions tending to produce a state of incipient coacervation, the latter state being indicated by the first appearance of a faint opalescence in the mixture, coacervation being prevented either by adding the ammonia in an amount insufficient to produce coacervation or by stopping the coacervating action before the appearance of any more than a faint opalescence in the mixture, mixing in as an insolubilizing agent a metal compound capable of forming an insoluble silicate in an amount sufficient to precipitate at least a substantial part of the silica in the mixture and recovering the finely divided precipitate thereby produced; the insolubilizing agent being mixed with the silicate no earlier than the ammonia is mixed therewith and under conditions maintaining the environmental conditions substantially uniform during the formation of the precipitate, whereby a substantially gel-free precipitate is obtained; all as more fully hereinafter set forth and as claimed.

This application is a continuation-in-part of our copending application Serial No. 293,846 (filed on June 16, 1952), and now abondoned, and which was in turn a continuation-in-part of our earlier application, Serial No. 763,444 (filed July 24, 1947), and now abandoned.

In prior application, S.N. 763,444, we described methods of obtaining finely divided solids by treating various inorganic colloidal solutions, such as solutions of sodium silicate, with coacervating agents and insolubilizing agents. The claims of S.N. 763,444 were eventually limited to the production of finely divided silica from colloidal silicate solutions by the use of acidic materials as insolubilizing agents although the use of metal compounds forming insoluble silicates was described and illustrated by several specific examples. This latter subject matter was divided out of S.N. 763,444 and was placed in copending application S.N. 293,846 and now in the present application along with additional descriptive matter and specific examples.

In our copending application, S.N. 292,936, filed June 11, 1952, and now abandoned, which is also a continuation-in-part of S.N. 763,444, we describe more specifically how it is possible to obtain fine silica in particle sizes ranging down to about 7 millimicrons by use of special mixing techniques and control of the conditions of the process. These mixing techniques and controls are also applicable to the production of the metal silicate products of the present invention and are required when the finest particle sizes are desired.

There are many industrial applications of finely divided inorganic materials and a large number of procedures have been developed for the production of such materials. Grinding is, of course, the most widely used and on the whole one of the most satisfactory methods of obtaining finely divided materials. But grinding to any high degree of fineness requires the expenditure of a large amount of power and this factor usually renders the method impractical when a fineness of the order of about 1 micron or below is desired. Various other methods have been suggested for the production of fine particles, such as chemical reactions in the vapor phase, chemical precipitating methods, subliming methods, condensations from the vapor phase, methods involving gelation, etc. Most of these methods are expensive, however, and others have drawbacks which render them unattractive. In spite of these unfavorable features, however, several of these auxiliary methods have been used commercially owing to the great demand for pigments, fillers, delustering agents and the like.

The present invention relates to a novel method of forming finely divided particles of metal silicates, which may contain finely divided silica and metal oxide particles in addition to metal silicate particles, the particle size of these products ranging from a few microns down to about 7 millimicrons. The method is generally applicable for the production of a wide range of finely divided metal silicates which are insoluble in aqueous solution. The method usually produces amorphous particles the bulk of which are spherical and which are characterized by their unusual softness. But in some cases crystalline particles are produced.

In this method a sodium silicate solution, having a concentration of $SiO_2$ ranging from about 1 to 30 percent by weight and having a weight percent ratio of $Na_2O$ to $SiO_2$ within the range of from about 2:1 to 1:4 is mixed with ammonia as a coacervating agent. This readily produces coacervation of the silicate solution if added thereto in sufficient proportions. The higher concentrations of $SiO_2$ are employed with the higher ratios of $Na_2O$ to $SiO_2$. For the production of particle sizes below about 20 millimicrons ($m\mu$) in diameter the concentration of $SiO_2$ in the final mixture should be within the range of from about 0.5 to 8 percent by weight and the ratio of $Na_2O$ to $SiO_2$ of the silicate solution should be within the range of from about 1:2.4 to 1:4. The quantity of ammonia added is usually below that required to produce full coacervation of the solution and at a maximum is usually only sufficient to form what might be called a protocoacervate, i.e. a solution in the state of incipient coacervation. If an excess above this maximum is added it is necessary by means of a special mixing technique to stop the action of the ammonia as described below before its full effect has been realized. The state of incipient coacervation is indicated by the appearance of the first faint opalescence in the solution. More sensitive criteria, such as dark field examination may be used. For the production of the finest particles this state should not be exceeded before the addition of an insolubilizing agent whose usual effect is to stop the coacervating action by insolubilizing the micelles present, although initially it may tend to promote the coacervating action by increasing the ionic strength of the solution. In the present invention the insolubilizing agent may be any compound of a metal which is water soluble but capable of forming an insoluble silicate.

Certain rather well defined relationships have been established between the three elements involved in our new process, namely the silicate solution, the ammonia and the insolubilizing agent, and the manner in which these elements are mixed. For the production of the finest particle sizes we have found it essential to add the ammonia and the insolubilizing agent to the sodium silicate solution in such a fashion that insolubilization commences before coacervated particles become visible in the dark field microscope. Coacervation requires an appreciable time interval and hence it is possible to add an excess of ammonia and then to mix in a solution of the metal compound quickly before the coacervating action has fully become effective. It is also possible and sometimes more convenient to add the ammonia in a quantity short of that required, under equilibrium conditions, to produce incipient coacervation, after which the metal compound can be added immediately or after the lapse of a time interval. Rapid mixing is not as essential if this latter technique is used.

Some coacervating agents act rapidly and some slowly. Using ammonia as a coacervating agent it is usually more convenient to add less than that required to produce the first appearance of opalescence but it is possible to use an excess of ammonia while adding the insolubilizing metal compound either simultaneously therewith or immediately thereafter and rapidly agitating the mixture to produce complete mixing within a period of less than about 10 seconds. In this way, no substantial concentration or temperature changes take place during the actual formation of the insoluble particles. In other words the environmental conditions are maintained substantially constant during the formation of the ultimate particles. This we have found to be highly important in the formation of a product which is free from gel and of uniform particle size.

We have found a rather simple way of testing our finely divided products for the presence therein of gel material. This is done by subjecting the products to a 325 mesh wet screen test after grinding under standard conditions. Any residue left on the screen after the test can be considered gel. This is the same test which has been approved as standard for carbon black and is known as ASTM Test D-185-45; see American Society for Testing Materials Standards of 1949, part 4, page 163. Products produced by the preferred method of the present invention pass this 25 mesh wet screen test leaving a residue on the screen of less than 0.5% and usually less than 0.1%.

The quantity of ammonia to be used in a given case can be estimated by a rather simple test. If the ammonia is added slowly in measured quantities to the silicate solution with a sufficient time interval between additions to permit equilibrium conditions to be substantially reached, between additions, a point will be found at which a faint opalescence will become visible. This quantity of ammonia can be called 100% for comparative purposes. We have found that it is usually possible to vary the quantity of ammonia used in our process from a value of about 20% up to a maximum of 500% expressed in terms of this quantity required to produce the first appearance of opalescence when added under equilibrium conditions. When an excess, i.e. over 100%, is added the time of addition of the insolubilizing agent and the mixing conditions must be carefully controlled. Rapid mixing must be used. The insolubilizing agent can be added simultaneously with the ammonia either by the use of two separate streams or a pre-mixture of ammonia and insolubilizing agent can be used. It is essential, of course, that the ammonia be mixed with the silicate solution not later than the insolubilizing agent is mixed therewith since, if the insolubilizing agent is mixed in first, no finely divided particles will be formed but a gelatinous or curdy mass. It is evident that the coacervating agent may be a mixture of highly water soluble salts or organic reagents with the ammonia as the primary agent.

The insolubilizing metal compound must be soluble in water and, as stated previously, it must form an insoluble silicate when mixed with silicate solutions. It is usually an electrolyte. It may be a salt, oxide or hydroxide of any metal from which insoluble silicates can be formed in the wet way or whose metal ions precipitate insoluble metal silicates from aqueous silicate solutions. At least 25 metals are known whose ions are capable of precipitating insoluble silicates from aqueous solution and any compound of these is operative which is more soluble in water than the corresponding metal silicate. A simple test for the operativeness of an insolubilizing agent with ammonia and silicate solution is to mix the three simultaneously. If a precipitate is formed in the resulting mixture, the insolubilizing agent also will be found to produce a finely divided precipitate when added to a protococervate formed from the silicate solution and the ammonia.

The ammonia coacervating agent should preferably be compatible with the metal compound insolubilizing agent; at least any reaction products formed by mixing the two must be more soluble than the final precipitate recovered in the process.

A large amount of information has accumulated within the past few years concerning the phenomenon known as coacervation. Langmuir, in an article published in J. of Chem. Phys., 6, 873–896 (1938), presents a mathematical formula showing that coacervation occurs when, in a sufficiently dilute solute solution of highly charged plate-like particles, the osmotic pressure reaches a value of $8.9 \times 10^7/B^2$ dynes/cm.$^2$. This coacervation constant is related to the dielectric constant of the solvent, the charge on an electron, etc. B is the distance in centimeters between the platelets. The constant represents a repulsive force which is independent of the charge but does depend on the concentration of the univalent ions. Polyvalent ions decrease the force.

The theoretical expression used by Langmuir, when osmotic pressure is plotted against concentration of colloid, has an S-shaped curve like that of the gas laws in the critical region, which indicates that coacervation is a critical phenomenon. In the critical region a maximum of osmotic pressure occurs and in our new process it is evidently necessary to bring the solution to a point just short of this maximum point by the addition of ammonia. The addition of insolubilizing agent then increases the osmotic pressure and ionic strength and decreases the field of force as a consequence of which precipitation occurs.

In his article, Langmuir has a table showing the correlation of the concentrations producing coacervation for various materials and with the calculated concentrations.

It seems probable, in view of Langmuir's findings, that the protocoacervate produced in our new process is a dispersion of micelles which are kept separated by ordinary thermal agitation but tend very strongly to form the tactoid groups which Langmuir defines as having the characteristics of a solid material, "often having such low mechanical strength that it appears to flow like a liquid." It appears likely that, when the insolubilizing agent is added to the protocoacervate, this agent reacts with the micelles to produce an insoluble precipitate the particles of which, on account of the speed of the insolubilizing reaction, retain to at least some extent the structure of the original micelles, very little agglomeration taking place. A precipitate is produced in this manner which, surprisingly, is totally different from that which would be produced if the insolubilizing agent should be added directly to the solution without any prior addition of ammonia.

Verwey and Overbeek in their book the "Theory of the Stability of Lyophobic Colloids," New York, Elsevier Publishing Co., 1948, have also discussed the principles of coacervation at some length. For the region of very small particles they are in substantial agreement with Langmuir, although there are some basic differences in their theoretical approaches.

Among the various possible insolubilizing agents which can be used in our process we consider the alkaline earth metal oxides and hydroxides, such as the oxides and hydroxides of calcium, magnesium, barium, and strontium, to be of particular importance. Finely divided particles of calcium and magnesium silicates produced in this manner have special utility. Other insolubilizing agents which we have found advantageous in our process include oxides, hydroxides and salts of metal in groups (Ib) to VIII of the periodic table, which have a solubility of at least $1 \times 10^{-5}$ g. in 100 g. of water, such as $Al_2O_3$, $Fe_2O_3$, HgO, SnO, ZnO, CoO, NiO, $As_2O_3$; their salts such as $FeSO_4$, $Al_2(SO_4)_3$, $K_2TiF_6$, $NaAlO_2$, $ZnCl_2$, $CuCl_2$ and $Ti(SO_4)$. It is possible to employ as insolubilizing agents salts of amphoteric metals wherein the metal atoms occur in the anions, i.e. the alkali metal salts of amphoteric acids, with the resulting production of finely divided solid particles which consist of metal silicates. The particles produced are of uniform size and composition. Excess alkali should be avoided as this may destroy the colloidal nature of the silicate solution. In contrast if salts of these same metals are employed, wherein the metal is in the cation, the precipitates usually are nonhomogeneous mixtures of particles of metal silicate, $SiO_2$ and metal oxide which particles can be distinguished under a high power microscope. Thus finely divided particles of metal silicates can be obtained in accordance with the present invention by mixing solutions of the alkali metal salts of bismuth, cerium, tantalum, titanium, arsenic, antimony, tin, platinum, gold, iron, tungsten, vanadium, molybdenum, columbium, aluminum, zinc, lead, chromium, and manganese with a protocoacervate of an alkali metal silicate solution. The alkali metal salt used as insolubilizing agent in this procedure can usualy be formed in situ, if desired. For example if litharge is added to the protocoacervate of an alkali metal silicate solution having a pH of at least about 11, the lead oxide will go into solution as sodium plumbate and this will cause a precipitate of finely divided particles of lead silicate. In the absence of the step of forming the protocoacervate, the desired procedures normally produce a curdy or gelatinous precipitate of little or no utility.

The quantity of insolubilizing agent employed should be sufficient to precipitate at least a substantial portion of the silica present in the silicate solution; otherwise the process is not economical. A simple way of testing whether sufficient insolubilizing agent has been added is to filter off the precipitate and then to add more insolubilizing agent to the filtrate. If a secondary precipitate is formed in the filtrate this shows that precipitation was originally incomplete. In some cases, of course, it may be advantageous to conduct our process by adding the precipitating agent step-wise and filtering off the precipitate after each addition. In this manner products having exceptionally fine particles of relatively uniform size can be obtained. But if one of our preferred mixing methods is employed such products can be obtained rather easily in one step. An excess of insolubilizing agent over that required to precipitate all the silica from the mixture can be added if desired. The excess does no harm, it is merely wasted.

As described more completely in our copending application, Serial Number 292,936, it is possible to obtain finely divided products having a particle size below 1 micron by mixing a coacervating agent with a silicate solution in a beaker, for example, and subsequently adding the insolubilizing agent while stirring. If this three-solution mixing technique is used the insolubilizing agent is added rapidly and must be thoroughly mixed in before the appearance of substantially any irreversible precipitate in the mixture. Otherwise the product will contain considerable amount of gel. Using this mixing technique the maximum amount of ammonia which can be used may amount to 150% while the minimum amount which can be used is roughly about 20 to 50% of that required to produce the first appearance of opalescence when added slowly under equilibrium conditions. The particle size can be controlled by the amount of ammonia added. Other factors being equal, the less the amount of ammonia employed the finer the particles in the resulting product.

In general the more efficient and the more rapid the mixing, the finer the particles produced. Several continuous mixing techniques are available wherein converging streams or jets of the reactants are employed followed by continuously filtering off the precipitate formed. For example the silicate solution can be continuously mixed in a Y tube with ammonia and this mixture impelled in a jet to be mixed with a jet of the insolubilizing agent. It is also usually possible to mix the ammonia with the insolubilizing agent in a Y tube followed by mixing the resulting mixture in the form of a jet with a jet of the silicate solution. In this latter method it is evident that the ammonia and the insolubilizing agent are mixed with the silicate solution simultaneously and in a predetermined ratio.

In all of the mixing techniques mentioned it is evident that during the formation of the ultimate particles the environmental conditions of concentration, temperature, pH and the like are maintained substantially constant. And, as mentioned previously, this is important in obtaining products of the finest particle sizes free from gel. In contrast, if mixing is accomplished by adding the ammonia to a beaker containing the silicate solution and the insolubilizing agent is then added slowly under agitating conditions over a period of say from 1 to 20 minutes, the resulting product will contain a substantial proportion of gel and the non-gel portion will consist of particles of widely different sizes. Under these conditions of mixing it is evident that the environmental conditions of concentration, pH, temperature etc. vary substantially from the beginning to the end of the mixing.

The mixing of streams or jets of the reactants in the ways described can, of course, be conducted on a commercial scale, the mixtures produced being passed to a continuous filter of the rotary drum type or being filtered on a moving filter belt, for example. The jet mixing techniques are capable of producing products whose average particle size is less than 20 m$\mu$ down to a minimum of about 7 m$\mu$ and containing less than 0.1% gel.

These products, because of their small particle size and consequent high area, have a low bulk density depending in part on the individual products. Materials with such a low bulk density are difficult to handle and mix as a filler and also are uneconomical to ship. We have found that the bulk density can be satisfactorily increased to much more economical ranges by degasifying and/or pressing the dry product. A preferred method is to add a small amount of an oil such as a light petroleum oil. This amount may range from about 0.05 to 0.2% of the weight of the powder.

Our invention can be described in greater detail by references to the following specific examples which represent practical operating embodiments of our invention.

*Example 1*

To 1000 pounds of a solution of "N" sodium silicate sold by Philadelphia Quartz Company containing 8.6% $SiO_2$ and a weight ratio of 3.2 $SiO_2$ to 1 $Na_2O$ was added 510 pounds of 28% $NH_3$ solution. An insolubilizing solution containing 40% by weight of $CaCl_2$ was stirred in. The filtered, washed and dried mass was composed of particles ranging in size from 0.1 to 0.3 m$\mu$ and with an index of refraction above 1.61. The void space was 0.78.

The bulk of the particles in the product were calcium silicate but there were some particles of $SiO_2$ and CaO present. The initial bulk density of this product dried at about 100° F. was about 8 pounds per cubic foot. This product was densified by mixing 0.1% of a petroleum oil, Tiona #1050, sold by Tiona Petroleum Company and having the following properties: A.P.I. gravity—28.3°, Saybolt Universal viscosity at 100° F.—1008, viscosity index—96, and pour test—0° F.

The bulk density was increased over 2 times to about 20 pounds per cubic foot.

Example 2

To the protocoacervate formed in Example 1 was added a sodium aluminate solution containing 342 pounds of $NaAlO_2$. 157 pounds of product was obtained on filtering, washing and drying. The particle size was about 2 microns, and the porosity 0.80.

The particles obtained were uniform and composed of aluminum silicate, no particles of $SiO_2$ or $AlO_3$ being evident.

Example 3

To the protocoacervate formed in Example 1 was added a slurry of $FeCl_3.6H_2O$ containing sufficient iron to form $1Fe_2O_3.9SiO_2$. A brown color first appeared and in 30 seconds the whole mixture "set up" in the usual manner. The product was an intimate mixture of fine pigment particles of $SiO_2$, $Fe_2O_3$ with some iron silicate which maintained its color under the heat of an oxygen-gas torch.

Example 4

If in Example 1 the protocoacervate is insolubilized with a slurry containing 77.8 pounds of CaO instead of $CaCl_2$ a pasty mix is gradually formed over a period of several hours. This yields 164 pounds of calcium silicate having an average particle size of about 0.5 micron and a refractive index greater than 1.61 and less than 1.67.

Example 5

If the protocoacervate of Example 1 is insolubilized with 76 pounds of $Al_2(SO_4)_3$ in a saturated solution the washed and dried product will contain an intimate mixture of about 86.1 pounds of $SiO_2$ with an average particle size of 0.1 micron and a refractive index of about 1.45 and about 22.7 pounds of $Al_2O_3$ with an average size of about 20 microns and a refractive index of greater than 1.64. Some aluminum silicate particles are also present.

Example 6

When an equivalent amount of titanium sulfate was substituted for the aluminum sulfate used in Example 5 a product was obtained which contained about 10 to 20% of crystalline material with a refractive index of over 1.65. This is probably $TiO_2$. Most of the particles were about 1 to 2 microns in size and had a refractive index of over 1.65. These particles appeared to be $SiO_2$. However, if $K_2TiF_6$ was substituted for the titanium sulfate, no crystalline material was obtained. The titanium silicate product obtained had a particle size of from about 1 to 2 microns and had a refractive index below 1.50.

Example 7

Chromium sulfate and chromium chloride were substituted for the titanium sulfate used as insolubilizing agent in Example 6. Both of these insolubilizing agents gave products which were mixtures of $SiO_2$ and $Cr_2O_3$, along with what appeared to be chromic silicate.

Example 8

In this example a number of comparative tests were run using different insolubilizing agents. The results obtained are collected in the following table. In each test a protocoacervate was initially formed by adding a solution of ammonia to 50 parts by volume of a 25% solution of "N" silicate of soda solution, the quantity of ammonia added being just sufficient in each case to form a faint opalescence in the mixture. To the resulting protocoacervate a stoichiometric equivalent of an insolubilizing agent was added, as indicated in the first column of the table. The table indicates the particle size of the finely divided precipitate obtained.

| Insolubilizing Agent | Coacervating Agent | Particle size (Microns) |
|---|---|---|
| CdO | $NH_4OH$ | 1 |
| CoO | $NH_4OH$ | 2 |
| NiO | $NH_4OH$ | 2 |
| ZnO | $NH_4OH$ | 0.5 |

In the above table it will be noted that several of the metal oxides listed as insolubilizing agents form complex ions with ammonium hydroxide. These metal oxides obviously went into solution as metal amines, the latter then serving as insolubilizing agent. We have found that any of the heavy metal amines can be employed in this manner as insolubilizing agents.

Example 9

50 parts of "N" silicate of soda were mixed with 50 parts by volume of GR–S latex (type 3, total solids 38.12, Naugatuck Chemical Co.). A protocoacervate was formed by adding 30 parts of 28% $NH_4OH$ and an intimate mixture of rubber fibers and $CaSiO_3$ was formed by adding $CaCl_2$ solution equivalent to the $SiO_2$. The non-rubber component of the resulting rubber crumb had a refractive index of 1.62.

Example 10

A mixture was made containing 300 parts by weight of natural latex (33% solids) and 1980 parts by weight of a 25% solution of "N" sodium silicate solution. To this mixture was added 972 parts of a 28% $NH_3$ solution containing 1 part by weight of piperidinium N-pentamethylenedithiocarbamate, as accelerating agent, and 1 part by weight of phenyl beta-naphtylamine, as antioxidant, and in which 1 part of stearic acid had been emulsified. This produced a protocoacervate. To this was added a mixture containing 17 parts of zinc chloride and 340 parts by weight of concentrated HCl (30% solution), as insolubilizing agent. The rubber crumb thus produced was filtered off and dried. Fully compounded rubber obtained in this way can be milled, if desired, before vulcanization depending upon the use to which it is put.

Similar procedures can be used in compounding rubbers suitable for use as tire treads and carcasses, rubber heels, etc. as will be understood by those skilled in the art.

Example 11

30 parts by volume of 28% $NH_4OH$ were mixed with 50 parts of 25% "N" silicate of soda and 3 parts by weight of a silk fabric was dipped into the resulting coacervate. Insolubilization was obtained by the addition of a quantity of lead chloride equivalent to the $SiO_2$. The silk fabric was found to be weighted with a lead silicate product uniformly deposited in and on the fibers.

Example 12

20 parts of "E" silicate of soda solution sold by Philadelphia Quartz Company and containing 8.6% $Na_2O$ and 27.7% $SiO_2$ was diluted with 50 parts of $H_2O$. 41 parts of $NH_4OH$ solution (28° Bé.) was mixed in and 5.6 parts of $MgCl_2.6H_2O$ diluted with 3.5 parts of $H_2O$ was added within 10 seconds after the development of haze was indicated. The product was filtered immediately after precipitation at room temperature and washed and dried. The particle size by the P & G test was 11 m$\mu$ and a wet residue of 0.8% was found. A very similar product was obtained when this same precipitate was boiled for one hour and then filtered and washed and dried. The particle size was 10 m$\mu$ and the wet sieve residue had been reduced to 0.2%. It was doubtful whether the differences in the wet sieve residue are significant. The comparison in the tests indicates that the boiling has no significant effect on our product.

The products of this invention are useful in a large number of industrial applications, in fact they are useful wherever finely divided products can be used. These products have a particle size varying approximately from a few microns down to about 7 millimicrons, the particle size being extremely uniform in a given product.

It has been found that the products of this invention may be compounded with mineral hydrocarbon oils to produce excellent greases and high temperature lubricants. The products produced in accordance with this invention may be compounded with mineral lubricating oils to produce such greases and lubricants in much the same manner that other greases containing silica compounds are compounded. Any desired additive may also be incorporated into such grease formulations.

Probably the most universal use for these products is as fillers for plastics and resins of all types and as extenders for fertilizers, insecticides, etc. The products which are colored can be used as pigments in paints, inks, etc. Several of our products are adapted to fine polishing procedures by reason of their fineness, softness and spherical shape. The arsenic silicate products can be used as insecticides. The zinc, magnesium, barium, calcium and lead silicate products can be used as reinforcing agents in the compounding of rubber. Our products can be produced at a cost which is usually considerably below that of other processes now used for producing products of a comparable particle size. In addition our products have the advantage that they can be readily washed free from extraneous matter owing to their excellent filtering properties. They can be obtained in a highly pure condition. For this reason they can be used as excipients in pharmaceutical preparations and the like. Many other uses for these products will occur to those skilled in the art.

Our process lends itself to the production of filled products of various types. Water soluble resins, for example, can be filled by forming one of our protocoacervates in the presence of a dissolved resin followed by precipitating the resin and the finely divided silicate compound simultaneously by mixing in a mutual insolubilizing compound. Thus sodium rosinate can be dissolved in sodium silicate, ammonia added and co-precipitation produced with an acid-reacting metal salt solution. Polyvinyl alcohol resins can also be filled in this manner. If one of our precipitates is formed in the presence of a finely divided material, such as paper pulp, asbestos fibers or other fibrous material in suspension, the finely divided precipitate is formed in and on the fibers and the latter become thoroughly impregnated.

While we have described what we consider to be the most advantageous embodiments of our process it is evident, of course, that various modifications can be made in the specific procedures which have been described without departing from the purview of this invention. It is believed obvious from the above description that our process is capable of producing colloidal-sized particles of a large number of metal silicates which may contain metal oxide and/or silica in addition to the metal silicate. Owing to the large number of possible compounds involved and of the many modifications of procedure which may be followed, it is impossible to set out any specific ranges of concentrations, temperatures and the like which are applicable to all cases. Neither is it possible to set out a single specific procedure which would be applicable to the preparation of all of the various possible finely divided products. However we believe that the foregoing specific examples, coupled with the description of the general principles involved in our invention, will enable those skilled in the art to produce the finely divided products falling within the scope of this invention. A large number of mixing procedures are available which conform to the principles set out. As pointed out previously, in general the more rapid the mixing the more finely divided the products produced. Mixing can be accomplished in conventional mixing tanks by introducing the reactants simultaneously through two or more pipes, if desired, in order to maintain the environmental conditions relatively constant during formation of the precipitate. It is possible to substitute solutions of other alkali metal silicates, such as potassium silicate, for the sodium silicate solutions used in the described processes. Conventional ways of separating the precipitate can be used but it is usually advisable to separate the product promptly after it is formed since there may be a tendency for the particles to agglomerate if they are kept in suspension too long. Further modifications of our process which fall within the scope of the following claims will be immediately evident to those skilled in this art.

What is claimed is:

1. In the manufacture of finely divided metal silicate products, the process which consists essentially in (a) preparing an aqueous solution of sodium silicate, having a weight percent ratio of $Na_2O$ to $SiO_2$ within the range of from about 2:1 to 1:4 and a concentration of $SiO_2$ ranging from about 1 to 30 percent by weight, (b) mixing said aqueous solution with ammonia in a quantity and under conditions tending to produce a state of incipient coacervation but without the formation of an insoluble precipitate, the incipient coacervation being indicated by the first appearance of a faint opalescence in the mixture.

(c) more than incipient coacervation being prevented by mixing in an aqueous solution of an insolubilizing agent comprising a metal compound which forms an insoluble silicate before the appearance of more than a faint opalescence in the mixture, and completing the mixing in of said insolubilizing agent before precipitation occurs;

(d) the quantity of said insolubilizing agent employed being sufficient to convert at least a substantial proportion of the sodium silicate into an insoluble precipitate, and said insolubilizing agent being mixed with the sodium silicate solution no earlier than the ammonia is mixed therewith.

(e) maintaining the environmental conditions of concentration, temperature and pH substantially constant during the entire period of formation of the insoluble precipitate by completing the mixing in of the insolubilizing agent within a period not substantially exceeding 10 seconds, and (f) recovering the resulting finely divided substantially gel-free precipitate.

2. The process according to claim 1 wherein the ammonia and insolubilizing agent are added simultaneously to the silicate solution, the ammonia being in a quantity amounting to from about 100 to 500% of that which is required, when added sufficiently slowly to permit equilibrium conditions substantially to be established, to produce the first appearance of a faint opalescence in the mixture.

3. The process of claim 1 wherein jet-mixing is employed and a jet of the insolubilizing agent is mixed with jets of the sodium silicate solution and of the ammonia.

4. The process of claim 1 wherein the mixing is conducted by mingling streams of the sodium silicate solution, ammonia and insolubilizing agent and the finely divided product is continuously filtered from the resulting mixture.

5. The process of claim 1 wherein a finely divided material is present in the final mixture during the formation of the precipitate, whereby the said material becomes impregnated with the finely divided metal silicate product formed in the process.

6. The process of claim 1 wherein rubber latex is present in the mixture during the formation of the precipitate and the insolubilizing agent is one capable of coagulating the latex, whereby a rubber crumb is recovered impregnated with the finely divided metal silicate formed in the process.

7. The process of claim 1 wherein the concentrations of the reactants are adjusted so that the $SiO_2$ concentration in the final mixture is from 0.5 to 8% by weight and wherein the ratio of $Na_2O$ to $SiO_2$ is from 1:2.4 to 1:4.

8. The process according to claim 1 wherein the insolubilizing agent is calcium chloride.

9. As a new product, a finely divided, wet-precipitated metal silicate having an extremely uniform particle size in any one product which may vary from several microns down to about 7 millimicrons in different products, the particles being amorphous, the bulk being spherical and characterized by unusual softness, the product being insoluble in water and containing a small proportion of particles of silica and metal oxide in addition to particles of metal silicate; said product being produced by the process of claim 1, whereby it is substantially free from particles of gel.

10. As a new product, a finely divided, wet-precipitated metal silicate having an extremely uniform particle size in any one product which may vary from about 20 to 7 millimicrons in different products, the particles being amorphous, the bulk being spherical and characterized by unusual softness, the product containing a small proportion of particles of silica and metal oxide in addition to particles of metal silicate and being produced by the process of claim 1, whereby it is substantially free from particles of gel and has a wet screen residue of less than 0.5%.

References Cited in the file of this patent

UNITED STATES PATENTS

| | | |
|---|---|---|
| 1,988,752 | Sessions | Jan. 22, 1935 |
| 2,434,418 | Le Lande | Jan. 13, 1948 |
| 2,485,287 | Hensen et al. | Oct. 18, 1949 |
| 2,498,353 | Bierce | Feb. 21, 1950 |
| 2,623,852 | Peterson | Dec. 30, 1952 |
| 2,629,691 | Peterson | Feb. 24, 1953 |
| 2,663,650 | Iler | Dec. 22, 1953 |

OTHER REFERENCES

Mellor: "A Comprehensive Treatise on Inorganic and Theoretical Chemistry," vol. 6, page 323, Longmans, Green and Co., London, 1925.

UNITED STATES PATENT OFFICE
CERTIFICATION OF CORRECTION

Patent No. 2,958,578

November 1, 1960

Chester L. Baker et al.

It is hereby certified that error appears in the above numbered patent requiring correction and that the said Letters Patent should read as corrected below.

In the grant, line 2, after "Pennsylvania," insert -- assignors to Philadelphia Quartz Company, of Philadelphia, Pennsylvania, a corporation of Pennsylvania, --; line 11, for "Chester L. Baker and John Frankle Austin, their heirs" read -- Philadelphia Quartz Company, it successors --; in the heading to the printed specification, lines 5 and 6, for "(both c/o Philadelphia Quartz Co., Public Ledger Bldg., Philadelphia, Pa.)" read -- assignors to Philadelphia Quartz Company, Philadelphia, Pa., a corporation of Pennsylvania --; column 1, line 45, for "abondoned" read -- abandoned --; column 3, line 42, for "25" read -- 325 --; column 5, line 31, for "platium" read -- platinum --; line 36, for "usualy" read -- usually --; line 75, for "amount" read -- amounts --; column 8, line 39, for "naphtylamine" read -- naphthylamine --.

Signed and sealed this 18th day of April 1961.

(SEAL)
Attest:

ERNEST W. SWIDER

Attesting Officer

DAVID L. LADD

Commissioner of Patents